US011625572B2

United States Patent
Chiu et al.

(10) Patent No.: US 11,625,572 B2
(45) Date of Patent: Apr. 11, 2023

(54) RECURRENT NEURAL NETWORKS FOR ONLINE SEQUENCE GENERATION

(71) Applicant: GOOGLE LLC, Mountain View, CA (US)

(72) Inventors: Chung-Cheng Chiu, Sunnyvale, CA (US); Navdeep Jaitly, Mountain View, CA (US); John Dieterich Lawson, Menlo Park, CA (US); George Jay Tucker, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 690 days.

(21) Appl. No.: 16/610,466

(22) PCT Filed: May 3, 2018

(86) PCT No.: PCT/US2018/030971
§ 371 (c)(1),
(2) Date: Nov. 1, 2019

(87) PCT Pub. No.: WO2018/204706
PCT Pub. Date: Nov. 8, 2018

(65) Prior Publication Data
US 2020/0151544 A1     May 14, 2020

Related U.S. Application Data

(60) Provisional application No. 62/500,919, filed on May 3, 2017.

(51) Int. Cl.
*G06N 3/04*     (2006.01)
*G06N 3/08*     (2023.01)

(52) U.S. Cl.
CPC ......... *G06N 3/0445* (2013.01); *G06N 3/0454* (2013.01); *G06N 3/08* (2013.01)

(58) Field of Classification Search
CPC ....... G06N 3/0445; G06N 3/0454; G06N 3/08
See application file for complete search history.

(56) References Cited

U.S. PATENT DOCUMENTS

2015/0356401 A1   12/2015   Vinyals et al.
2016/0171974 A1*   6/2016   Hannun ................. G06N 3/084
                                              704/232

(Continued)

OTHER PUBLICATIONS

Graves, Alex, et al. "Automated curriculum learning for neural networks." international conference on machine learning. PMLR, 2017. (Year: 2017).*

(Continued)

*Primary Examiner* — Fayyaz Alam
(74) *Attorney, Agent, or Firm* — Fish & Richardson P.C.

(57) ABSTRACT

Methods, systems, and apparatus, including computer programs encoded on a computer storage medium, for generating a target sequence from a source sequence. In one aspect, the system includes a recurrent neural network configured to, at each time step, receive an input for the time step and process the input to generate a progress score and a set of output scores; and a subsystem configured to, at each time step, generate the recurrent neural network input and provide the input to the recurrent neural network; determine, from the progress score, whether or not to emit a new output at the time step; and, in response to determining to emit a new output, select an output using the output scores and emit the selected output as the output at a next position in the output order.

11 Claims, 3 Drawing Sheets

(56) References Cited

U.S. PATENT DOCUMENTS

| | | |
|---|---|---|
| 2016/0189027 A1 | 6/2016 | Graves et al. |
| 2017/0011738 A1 | 1/2017 | Senior et al. |
| 2017/0162194 A1* | 6/2017 | Nesta ................. G10L 25/30 |
| 2019/0258907 A1* | 8/2019 | Rezende ............ G06V 30/274 |

OTHER PUBLICATIONS

Audhkhasi, Kartik, et al. "Recent progress in deep end-to-end models for spoken language processing." IBM Journal of Research and Development 61.4/5 (2017): 2-1. (Year: 2017).*
Zhang, Yu, et al. "Speech recognition with prediction-adaptation-correction recurrent neural networks." 2015 IEEE International Conference on Acoustics, Speech and Signal Processing (ICASSP). IEEE, 2015. (Year: 2015).*
Ba et al. "Learning wake-sleep recurrent attention models," NIPS, Dec. 2015, 9 pages.
Ba et al. "Multiple object recognition with visual attention," arXiv 1412.7755v2, Apr. 23, 2015, 10 pages.
Bahdanau et al. "Neural machine translation by jointly learning to align and traslate," arXiv 1407.0473v7, May 19, 2016, 15 pages.
Burda et al. "Importance weighted autoencoders," arXiv1509.00519v4, Nov. 7, 2016, 14 pages.
Chorowski et al. "Attention-based models for speech recognition," NIPS, Dec. 2014, 9 pages.
Graves "Generating Sequences with Recurrent Neural Networks," arXiv 1308.0850, Kime 5, 2014, 43 pages.
Graves "Practical variational inference for neural networks," NIPS, Dec. 2011, 9 pages.
Graves "Supervised Sequence Labelling with Recurrent Neural Networks," Dissertation, Technische Universitat Munchen, Jan. 14, 2008, 99 pages.
Graves et al. "Connectionist temporal classification: labeling unsegmented sequence data with recurrent neural networks," Proceedings of the 23rd international conference on Machine Learning, ACM, Jun. 25, 2006, 8 pages.
Graves, "Hybrid Speech Recognition with Deep Bidirectional LSTM," IEEE Workshop on Automatic Speech Recognition and Understanding, Dec. 8, 2013, 6 pages.
Gu et al. "Learning to translate in real-time with neural machine translation," arXiv 1610.00388v3, Jan. 10, 2017, 10 pages.
Jaitly et al. "An online sequence-to-sequence model using partial conditioning," NIPS, Dec. 2016, 9 pages.
Kalchbrenner "Grid Long Short-Term Memory," arXiv 1507.01526, Jan. 7, 2016, 15 pages.
Lee et al. "Speaker-independent phone recognition using hidden markov models," IEEE Transaction on Acoustics, Speech and Signal Processing, vol. 37 (11), Nov. 1989, 24 pages.
Li "Constructing Long Short-Term Memory Based Deep Recurrent Neural Networks for Large Vocabulary Speech Recognition," arXiv 1410.4281, May 11, 2015, 5 pages.
Luo et al. "Learning Online Alignments with Continuous Rewards Policy Gradient," ArXiv 1608,01281, Aug. 3, 2016, 9 pages.
Mnih et al. "Variational Inference for Monte Carlo Objectives," arXiv 1602.06725, Feb. 22, 2016, 12 pages.
Mnih et al. "Neural variational inference and learning in belief networks," arXiv 1402.0030v2, Jun. 4, 2014, 10 pages.
Mnih et al. "Recurrent models of visual attention," NIPS, Dec. 2014, 9 pages.
PCT International Preliminary Report on Patentability issued in International Application No. PCT/US2018/030971, dated Nov. 14, 20019, 20 pages.
PCT International Search Report and Written Opinion issued in International Application No. PCT/US2018030971, dated Nov. 26, 2018, 30 pages.
PCT Invitation to Pay Fees issued in International Application No. PCT/US2018/030971, dated Jul. 27, 2018, 20 pages.
Raffel et al. "Online and linear-time attention by enforcing monotonic alighments," arXiv 1704.00784, Apr. 3, 2017, 19 pages.
Tang et al. "Learning generative models with visual attention," NIPS, Dec. 2014, 9 pages.
Watkins "Learning from delayed rewards," Ph.D. thesis, King's College, Cambridge, May 1989, 241 pages.
Williams. "Simple statistical gradient-following algorithms for connectionist reinforment learning," Machine Learning, vol. 8(3-4), May 1992, 28 pages.
Xu et al. "Show, attend and tell: Neural image caption generation with visual attention," ICML, Jun. 1, 2015, 10 pages.
Zaremba et al. "Reinforement learning neural turing machines—revised," arXiv 1505.00521v3, Jan. 12, 2016, 14 pages.

* cited by examiner

RECURRENT NEURAL NETWORKS FOR ONLINE SEQUENCE GENERATION

BACKGROUND

This specification relates to recurrent neural network architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that generates a target sequence of outputs arranged according to an output order from a source sequence of inputs arranged according to an input order. The system is configured to begin generating the target sequence online, i.e., before each input in the input sequence has been processed.

Particular embodiments of the subject matter described in this specification can be implemented so as to realize one or more of the following advantages.

A neural network system can perform attention-based sequence-to-sequence processing online. That is, because at each time step the neural network generates a progress score that determines whether to emit an output or to move on to the next input, the system can begin generating an output sequence before having processed the entire input sequence. Thus, the latency between when the first input in the input sequence is received and the final output in the output sequence is generated can be greatly reduced relative to conventional systems that require the entire input sequence to be processed before beginning to generate outputs, i.e., because those systems apply a conventional attention mechanism over all of the inputs in the input sequence.

The amount of processing, i.e., the amount of computational resources, required to perform online sequence-to-sequence tasks such as voice recognition or translation can be decreased and the accuracy of performing such tasks can be increased. In particular, because of the progress decisions made at every time step, the system does not need to apply attention over all of the inputs in the input sequence when generating every output in the output sequence, reducing the amount of processing required to effectively generate an output sequence. A neural network system can use effective attention-based sequence-to-sequence transformation techniques even when the entire input sequence is not available to the system at a particular time step. A neural network system can process previous predictions and previous decisions about whether to emit an output as an input for a time step to improve the prediction and the decision about whether to predict at that time step.

Additionally, the system can train the neural network to generate online predictions more effectively by training the neural network to optimize a variational objective using variational inference. Training the neural network in this manner reduces variance in parameter updates during training, resulting in the training being more stable and more effective. Accordingly, the neural network can be trained using fewer computational resources, i.e., because fewer training iterations are required for the neural network to begin effectively generating predictions. In many cases, the variance of the parameter updates and therefore the effectiveness of the training can be further reduced by using a multi-sample variational objective, by employing an effective baseline, or both.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations. The system is a system for generating a target sequence of outputs arranged according to an output order from a source sequence of inputs arranged according to an input order. The system is configured to begin generating the target sequence online, i.e., before each input in the input sequence has been processed.

Each target sequence is a representation of the input sequence, e.g., a representation of the input sequence in a different form.

For example, if the input sequence is a sequence of words in an original language, e.g., a sentence or phrase, the target sequence generated by the system may be a translation of the input sequence into a target language, i.e., a sequence of words in the target language that represents the sequence of words in the original language.

As another example, the system may perform one or more speech recognition tasks. In one speech recognition example, if the input sequence is a sequence of graphemes, e.g., the sequence {g, o, o, g, l, e}, the target sequence generated by the system may be a phoneme representation of the input sequence, e.g., the sequence {g, uh, g, ax, l}. As another speech recognition example, if the input sequence is a sequence of audio features representing an utterance, the target sequence may be a sequence of phonemes that represent the utterance. As yet another speech recognition example, if the input sequence is a sequence of audio features representing an utterance, the target sequence may be a sequence of characters that represent the utterance.

As another example, the system may perform one or more text-to-speech tasks. That is, the input sequence can be a sequence of text or linguistic features of a text sequence and the output sequence can be a sequence of audio data, e.g., amplitude values, that is a verbalization of the text sequence.

As another example, the system may be a natural language processing system. For example, if the input sequence is a sequence of words in an original language, e.g., a sentence or phrase, the output sequence may be a summary of the input sequence in the original language, i.e., a sequence that has fewer words than the input sequence but that retains the essential meaning of the input sequence. As another example, if the input sequence is a sequence of words that form a question, the output sequence can be a sequence of words that form an answer to the question.

As another example, the system may be part of a computer-assisted medical diagnosis system. For example, the input sequence can be a sequence of data from an electronic medical record and the output sequence can be a sequence of predicted treatments.

Figure 1:
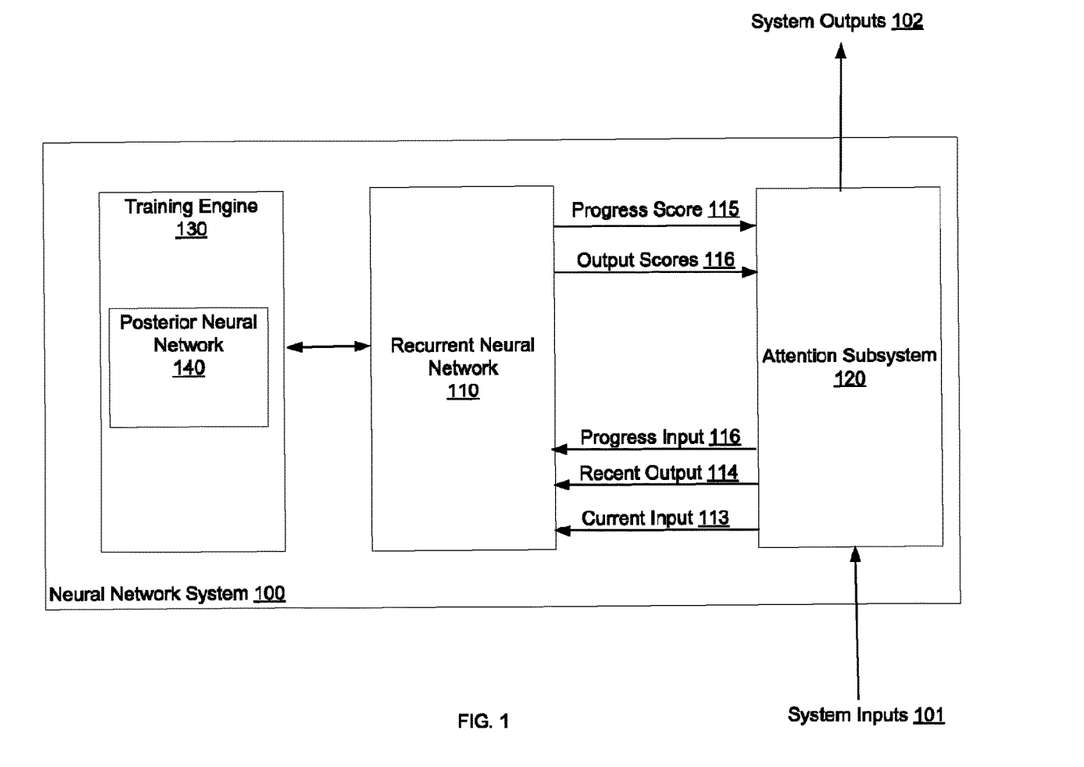
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 receives a sequence of system inputs 101 arranged according to an input order and processes the input sequence 101 to generate a sequence of system outputs 102 arranged according to an output order.

As described above, the neural network system 100 can perform any of a variety of tasks that require processing sequential inputs to generate sequential outputs.

The neural network system 100 includes a recurrent neural network 110, an attention subsystem 120, and a training engine 130.

The recurrent neural network 110 is a neural network that is configured to, at each time step of multiple time steps, receive a network input for the time step and process the network input in accordance with a current internal state of the recurrent neural network 130 to generate a network output and to update the current internal state of the recurrent neural network 110.

The network input for a time step includes a current input 113 in the input sequence 101 and a most recently emitted output 114 in the output sequence 102. In some implementations, the network input also includes a progress input 116. The progress input 116 indicates whether or not an output in the output sequence 102 was emitted at the time step that immediately preceded the current time step.

Which input from the system input sequence 101 is selected as the current input 113 depends on whether the system 100 determined to emit an output at the time step that immediately preceded the current time step. When an output was emitted at the time step immediately preceding the current time step, the current input 113 for the time step is the same as the current input at the immediately preceding time step, i.e., the recurrent neural network 110 sees the same current input 113 as was used at the immediately preceding time step. When an output was not emitted at the time step immediately preceding the current time step, the current input 113 for the time step is the next input in the input order after the current input at the immediately preceding time step, i.e., the recurrent neural network 110 sees a new current input at the time step immediately after determining not to emit an output.

The network output for a time step includes a progress score 115 for the time step and a set of output scores 116. The progress score 115 for the time step indicates whether the attention subsystem 120 should emit a new output in the output sequence 102 at the time step. The output scores 116 for the time step include a score for each of a set of possible outputs at the time step.

In some implementations, the recurrent neural network has a long-short term memory (LSTM) architecture. For example, the recurrent neural network may have a grid LSTM or a stacked deep LSTM architecture.

Examples of recurrent neural networks with LSTM architecture are described in Graves, *Generating Sequences with Recurrent Neural Networks*, at https://arxiv.org/pdf/1308.0850.pdf. Examples of recurrent neural networks with a grid LSTM architecture are described in Kalchbrenner, *Grid Long Short-Term Memory*, at https://arxiv.org/pdf/1507.01526.pdf. Examples of recurrent neural networks with a stacked deep LSTM architecture are described in Li, *Constructing Long Short-Term Memory Based Deep Recurrent Neural Networks for Large Vocabulary Speech Recognition*, at https://arxiv.org/pdf/1410.4281.pdf and Graves, *Hybrid Speech Recognition with Deep Bidirectional LSTM*, at https://www.cs.toronto.edu/~graves/asru_2013. pdf.

Processing network inputs by the recurrent neural network 101 to generate network outputs is described in greater detail below with reference to FIG. 2.

At each time step, the attention subsystem 120 provides the recurrent neural network 110 with the network input for the time step; receives the network output for the time step from the recurrent neural network 110; determines, based on the progress score 115 in the network output, whether to emit a system output for the time step; and, upon determining to emit a system output, generates a system output based on the output scores in the network output and adds the system output to the output sequence 102.

Generally, the attention subsystem 120 determines whether to emit a system output at a given time step in accordance with the progress score 115. In some implementations, the attention subsystem determines whether to emit a system output at a time step by sampling from two-point distribution, e.g., a Bernoulli distribution, in accordance with the progress score 115.

The result of the sampling is a value of a binary variable, where one of the two possible values of the variable, e.g., 1, indicates that the attention subsystem 120 should emit a new output, while the other possible value of the variable, e.g., 0, indicates that the attention subsystem 120 should not emit a new output. The attention subsystem 120 determines to emit a system output at a time step in the output sequence if the value of the binary value indicates that the attention subsystem 120 should emit a new output and determines not to emit a system output in the output sequence if the value of the binary variable indicates that the attention subsystem 120 should not emit a new output.

If the attention subsystem 120 determines to emit a system output in the output sequence 102 for a time step, the attention subsystem 120 uses the output scores 116 to determine which output of the set of possible outputs to emit at each time step. In some implementations, the attention subsystem 120 selects the output having the highest output score. In some other implementations, the attention subsystem 120 selects an output by sampling from the set of possible outputs in accordance with the output scores 116, i.e., so that each output is sampled with a likelihood that is defined by the output score for the output.

In some implementations, the output scores 116 include a respective score for each output in the set of possible outputs, e.g., a vocabulary, that includes multiple tokens, e.g., multiple words, and a predetermined special end of sequence output. In some of these implementations, the attention subsystem 120 is configured to terminate the output sequence 102 if the selected output at a given time step is the special end of sequence output.

Collectively, the recurrent neural network 110 and the attention subsystem 120 enable the neural network system 100 to generate the output sequence 102 in an online manner. In particular, the attention subsystem 120 can begin generating outputs in the output sequence 102 before the entire input sequence 101 has been processed by the recurrent neural network 110. At the time same time, the neural network system 100 can determine which inputs a given output in the output sequence 102 should be conditioned on, i.e., based on the progress scores. This technique is known as an attention-based approach to generating an output sequence. Thus, the neural network system 100 can use attention-based approaches to perform online sequence-to-sequence transformations. This is in contrast to conventional attention-based sequence-to-sequence approaches that require the entire input sequence 101 to have been processed in order to employ attention and thus cannot perform online sequence-to-sequence transformation.

The training engine 130 is configured to train the recurrent neural network 110 to generate network outputs based on network inputs. In particular, the training engine 130 trains the recurrent neural network 110 on training data that includes multiple training source sequences and, for each training source sequence, a corresponding correct target sequence. The correct target sequence corresponding to a given training source sequence is the output sequence that should be generated by the recurrent neural network 110 by processing the given training source sequence.

More specifically, the training engine 130 trains the recurrent neural network 110 jointly with a posterior neural network 140 to maximize a received reward by optimizing a variational objective using variational inference.

The posterior neural network 140 is a neural network that is configured to, at each time step while processing a training source sequence, generate a posterior progress score for the time step conditioned on (i) the training source sequence, (ii) the portion of the corresponding target sequence that should have been generated as of the time step, and (iii) progress inputs for earlier progress inputs for earlier time steps during the processing of the training source sequence that specify whether outputs were emitted at the earlier time steps.

More specifically, the posterior neural network 140 includes a bidirectional recurrent neural network configured to process a training source sequence to generate a bidirectional output for each input in the training source sequence. For example, the bidirectional neural network can be a deep bidirectional LSTM neural network. Using a bidirectional neural network ensures that bidirectional output for each input incorporates context from both before and after the input in the training source sequence.

The posterior neural network 140 also includes a unidirectional recurrent neural network, e.g., a deep unidirectional LSTM neural network, that is configured to, at each time step in a given training source sequence, receive a unidirectional input that includes (i) the bidirectional output for the time step, (ii) a current output from the target sequence, and (iii) a progress input that specifies whether an output was emitted at an immediately preceding time step and to process the unidirectional input to generate the posterior progress score for the time step. The current output from the target sequence at a given time step is the output from the target sequence that should be emitted at the next time step at which it is determined to emit an output. For example, if three outputs have already been emitted at earlier time steps, the current output for the given time step is the fourth output in the target sequence. Because the unidirectional neural network is recurrent, providing the unidirectional inputs in this manner ensures that the unidirectional neural network is conditioned on (i) the training source sequence, (ii) the portion of the corresponding target sequence that should have been generated as of the time step, and (iii) progress inputs for earlier progress inputs for earlier time steps during the processing of the training source sequence.

During the training, the training engine 130 feeds posterior progress scores generated by the posterior neural network 140 into the recurrent neural network 110 during the processing of training source sequences. In other words, the training engine 130 uses the posterior progress scores generated by the posterior neural network 140 to determine whether to emit an output at a given time step, i.e., instead of the progress score generated by the recurrent neural network 110. By using the posterior progress scores, the training engine 130 can reduce the variance in the parameter updates determined during the training, resulting in the training consuming fewer computational resources, generating a better-performing recurrent neural network 110, or both.

In particular, because the posterior neural network 140 has access to more information during training than does the recurrent neural network 110, the posterior progress scores generated by the posterior neural network 140 will generally be more accurate than corresponding progress scores generated by the recurrent neural network 110. Thus, using the posterior progress scores reduces variance in the parameter updates that would be caused by using the less accurate progress scores.

However, as can be seen from the description above, even though the training engine 130 has access to the entire training output sequence, the training engine 130 only conditions the posterior neural network 140 on a subset of that information, i.e., only on the portion of the corresponding target sequence that should have been generated as of the current time step and not on outputs in the target sequence that are after the current time step. This ensures that the posterior neural network 140 and, as a consequence, the training of the recurrent neural network 110 do not become excessively computationally intensive.

After training, the system 100 does not have access to the additional information required to use the posterior neural network 140 and therefore uses the posterior scores generated by the recurrent neural network 110 as described above. Because the values of the parameters of the recurrent neural network 110 are adjusted during the training to cause the recurrent neural network 110 to generate more and more accurate progress scores, after training the recurrent neural network 110 can generate accurate progress scores and, accordingly, accurate output sequence without access to the additional information about the correct target sequences.

Training the recurrent neural network 110 and the posterior neural network 140 on the training data is described in more detail below with reference to FIG. 3.

Figure 2:
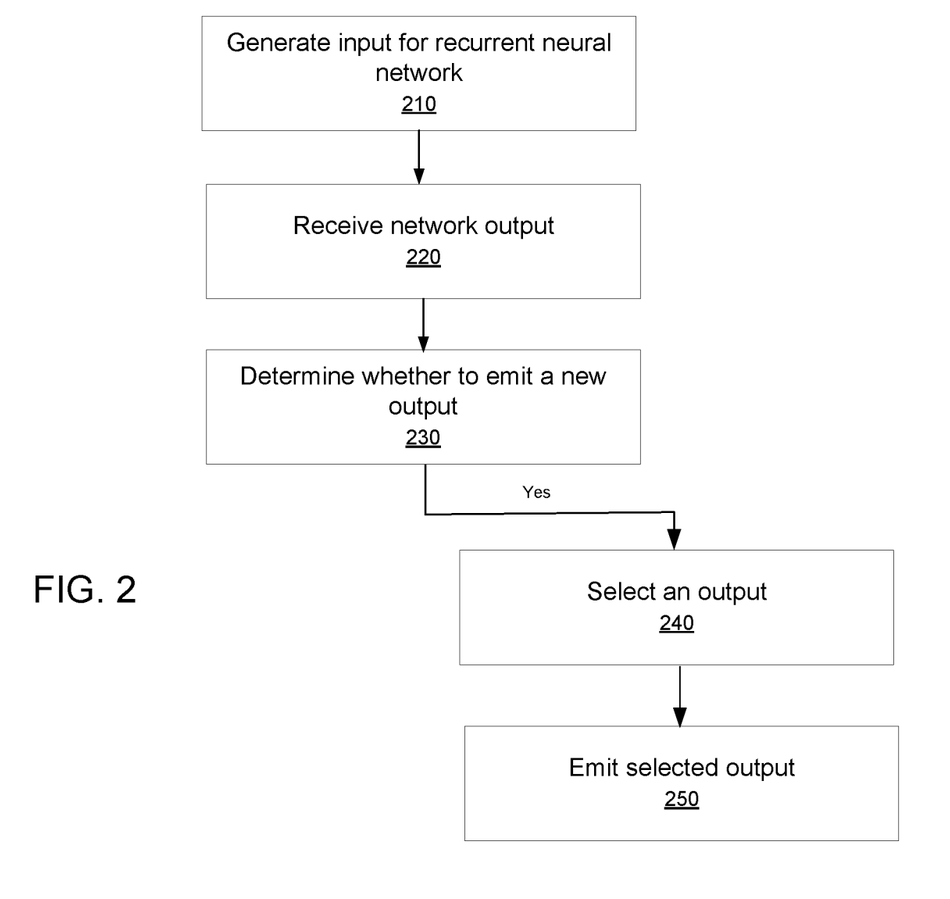
FIG. 2 is a flow diagram of an example process for processing network inputs to generate network outputs.

FIG. 2 is a flow diagram of an example process for generating an output sequence from an input sequence. For convenience, the process 200 will be described as being performed by a system of one or more computers located in one or more locations. For example, a neural network system, e.g., neural network system 100 of FIG. 1, appropriately programmed in accordance with this specification, can perform the process 200.

The system can generate the output sequence from the input sequence by repeating the process 200 for multiple time steps, i.e., until a special end of sequence output has been selected or some other termination criteria have been satisfied.

The system generates a network input for a recurrent neural network for the time step (210).

The network input can include a concentration of the current input in the input sequence and the most recently emitted output from the target sequence. In some implementations, the network input also includes a progress input that indicates whether or not an output was emitted at a time step immediately preceding the time step.

As described above, when an output was emitted at the time step immediately preceding the current time step, the current input for the time step is the same as the current input at the immediately preceding time step and when an output was not emitted at the time step immediately preceding the current time step, the current input for the time step is the next input in the input order after the current input at the immediately preceding time step.

The system receives a network output for the time step from the recurrent neural network, i.e., the network output generated by the recurrent neural network by processing the network input for the time step (220). The system output includes a progress score and a set of output scores.

The system determines, from the progress score, whether or not to emit a new output at the time step (230). In some implementations, the system samples from a two-point distribution, e.g., a Bernoulli distribution, in accordance with the progress score and uses the result of the sampling to determine whether to emit a new output at the time step.

If the system determines to emit a new output at the time step, the system selects an output using the output scores (240) and emits the selected output as the next output in the target sequence (250). In some implementations, the system selects an output in a set of possible outputs that has a highest output score. In some other implementations, the system samples from the set of possible outputs according to the output scores and uses the result of the sampling to select an output.

Figure 3:
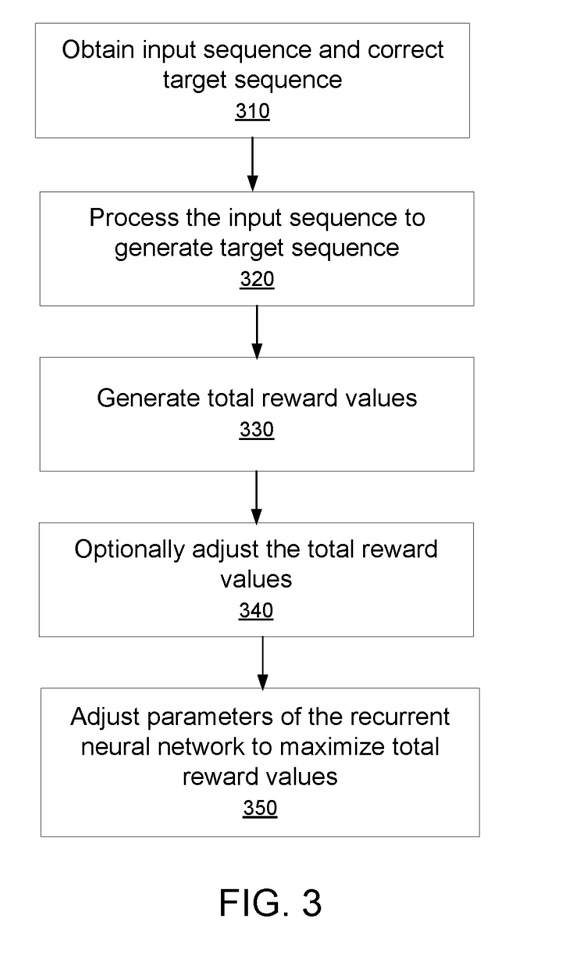
FIG. 3 is a flow diagram of an example process for training a recurrent neural network to process network inputs to generate network outputs.

FIG. 3 is a flow diagram of an example process for training a recurrent neural network to process network inputs to generate network outputs. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system obtains an input sequence and a correct target sequence that corresponds to the input sequence (310).

The system processes the input sequence to generate a target sequence (320). Generating an output sequence is described above with reference to FIG. 2.

Unlike in FIG. 2, however, at each time step while generating the target sequence the system uses the posterior progress score generated by the posterior neural network at the time step to determine whether to emit an output, i.e., rather than using the progress score as described above. That is, the system samples from the distribution in accordance with the posterior progress score instead of in accordance with the progress score generated by the recurrent neural network.

As described above, because the posterior neural network has access to more information than the recurrent neural network, the posterior progress scores are generally more accurate at a given stage of training than the progress scores, resulting in reduced variance in the parameter updates that are determined during training.

In some cases, as will be described below, to further reduce the variance of the training process, the system generates multiple target sequences in parallel from the same input sequence. That is, the system independently generates multiple target sequences from the same input sequence by independently sampling and making decisions about whether to emit an output at each time step for each of the multiple target sequences that are being generated. In other words, the system makes multiple independent determinations of whether or not to emit an output at each time step, i.e., one determination for each target sequence that is being generated.

The system generates total reward values based on the scores generated by the recurrent neural network during generation of the target sequence(s) and the correct target sequence (330).

In some implementations, for each time step during the generation of each of the output sequences, the system determines a total reward measure for the time step (also referred to as a "return").

The total reward for a given time step during generation of a given output sequence is based on the scores generated for correct outputs in the correct target sequence at time steps starting from the given time step. For example, the total reward at a given time step t can satisfy:

$$R_t = \rho_{t' \geq T} \log p(y_{t'} | s_{t'}, b_{t'}),$$

where T is the last time step during generation of the output sequence, p is the recurrent neural network, $y_{t'}$ is the correct output at time step t', $s_{t'}$ is the state at time step t', i.e., the preceding outputs in the output sequence, the preceding inputs in the input sequence, and the preceding emission decisions during generation of the output sequence, and $b_{t'}$ is the value of the binary variable at the time step t'.

The system optionally adjusts the total reward values (340). In particular, in some cases the system applies a baseline to the total reward values to further reduce the variance in the parameter updates.

Generally, the baseline includes one or more baseline terms that each, for a given sample at a given time step, are not dependent on the given sample at the time step.

For example, the baseline can include a term that is the average of the total rewards at the given time step for the other samples at the time step.

As another example, the baseline can include a leave-one-out (LOO) baseline term. The LOO baseline term at time step t for sample i of k total samples satisfies:

$$c = \frac{1}{k-1} \sum_{j \neq i} R_t^{(j)} + \frac{1}{k-1} \sum_{j \neq i} \sum_{t' < t} r_{t'}^{(j)} - r_t^{(i)}.$$

where r is the instantaneous reward at a time step, i.e., the logarithm of the score assigned by the recurrent neural network to the correct output at the time step.

As yet another example, the baseline can include a term that is based on, for a given sample and at a given time step, a sum of the total rewards in the other samples starting from when the other samples have emitted the same number of outputs as the given sample has emitted as of the given time step. In particular, this term can satisfy $$c = \frac{1}{k-1} \sum_{j \neq i} \sum_{t' > e_{t-1}^{(j)}}^{T} r_{t'}^{(j)},$$

where $e_t^{(j)}$ is the first time step at which sample j has emitted the same number of outputs as the sample i has at time step t.

The system adjusts the values of the parameters of the recurrent neural network and the posterior neural network using the total reward values or adjusted total reward values (350). Generally, the system adjusts the values to maximize the expected total rewards, i.e., updates the values so that expected total rewards to be received by the system by generating output values are increased.

More specifically, the system determines updates to the parameter values to optimize a variational objective using variational inference. In particular, the system performs an iteration of gradient ascent to maximize a lower bound on the variational objective.

In cases where the system generates only a single output the objective is a single-sample variational objective having a lower bound that satisfies:

$$E_{b \sim q}\left[\log \frac{p(y, b \mid x)}{q(b \mid x, y)}\right],$$

where E is the expectation function given that the value of the binary variable b is sampled from the posterior neural network q instead of the recurrent neural network p, and y is the correct target sequence.

In cases where the system generates multiple output sequences, the objective is a multi-sample variational inference for Monte Carlo objectives (VIMCO) objective that has a lower bound that satisfies:

$$E_{b^{(1:k)} \sim q}\left[\log\left(\frac{1}{k}\sum_{i=1}^{k} \frac{p(y, b^{(i)} \mid x)}{q(b^{(i)} \mid x, y)}\right)\right],$$

where there are k samples at each time step, i.e., k target sequences generated and $b^{(i)}$ is the i-th set of samples of the latent variable b.

Generally, with either the single-sample objective or a multi-sample objective, the system performs gradient ascent to train the recurrent neural network generate progress scores that reproduce the values sampled using the posterior progress scores while training the posterior neural network to maximize the total rewards (or the adjusted total rewards) while generating target sequences.

Determining these updates using gradient ascent is described in more detail in Andriy Mnih and Danilo Jimenez Rezende, "Variational inference for monte carlo objectives," CoRR, vol. abs/1602.06725, 2016.

The system can repeatedly perform the process 300 on different input sequence—correct sequence pairs to update the values of the parameters of the recurrent neural network and the posterior neural network from initial values to trained values.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of training a recurrent neural network, wherein the recurrent neural network is configured to, at each of a plurality of time steps:
    receive a recurrent neural network input for the time step comprising a current input for the time step and a most recently emitted output from the target sequence; and process the recurrent neural network input to generate (i) a progress score and (ii) a set of output scores, and wherein the method comprises:

training the recurrent neural network and a posterior neural network jointly on training data to maximize a received reward by optimizing a variational objective using variational inference, wherein the training data includes training source sequences and, for each training source sequence, a corresponding correct target sequence, and wherein the posterior neural network is configured to, at each of a plurality of time steps while processing a training source sequence:

generate a posterior progress score for the time step conditioned on the training source sequence, a portion of the corresponding correct target sequence that should have been generated as of the time step, and progress inputs for earlier time steps during the processing of the training source sequence that specify whether outputs were emitted at the earlier time steps.

2. The method of claim 1, wherein the posterior neural network comprises:

a bidirectional recurrent neural network configured to process the training source sequence to generate a bidirectional output for each input in the training source sequence; and a unidirectional recurrent neural network configured to, each of the plurality of time steps while processing the training source sequence;

process a unidirectional input comprising (i) the bidirectional output for the current input for the time step (ii) a current output from the target sequence and (iii) a progress input that specifies whether an output was emitted at an immediately preceding time step to generate the posterior progress score for the time step.

3. The method of claim 2, wherein the current output from the target sequence is the output from the target sequence that should be emitted at the next time step at which it is determined to emit an output.

4. The method of claim 1, wherein training the recurrent neural network and the posterior neural network on the training data comprises:

feeding posterior progress scores generated by the posterior neural network into the recurrent neural network during the processing of training source sequences.

5. The method of claim 4, wherein feeding posterior progress scores generated by the posterior neural network into the recurrent neural network comprises:

determining whether to emit outputs using the posterior progress scores instead of the progress scores generated by the recurrent neural network.

6. The method of claim 1, wherein the variational objective is a multi-sample variational objective.

7. The method of claim 6, wherein the multi-sample variational objective is based on making multiple determinations of whether or not to emit an output at each time step during the processing of a training example.

8. The method of claim 6, wherein the multi-sample variational objective is a VIMCO objective.

9. The method of claim 6, wherein the multi-sample variational objective is a VIMCO objective with a baseline that is based on, for a given sample and at a given time step, a sum of the future rewards in the other samples starting from when the other samples have emitted the same number of outputs as the given sample has emitted as of the given time step.

10. The method of claim 9, wherein the reward received at a time step is based on an output score generated for the output in the correct target sequence that should have been the output that was emitted at the time step.

11. A system comprising one or more computers and one or more storage devices storing instructions that, when executed by one or more computers, cause the one or more computers to perform operations for training a recurrent neural network, wherein the recurrent neural network is configured to, at each of a plurality of time steps:

receive a recurrent neural network input for the time step comprising a current input for the time step and a most recently emitted output from the target sequence; and process the recurrent neural network input to generate (i) a progress score and (ii) a set of output scores, and wherein the method comprises:

training the recurrent neural network and a posterior neural network jointly on training data to maximize a received reward by optimizing a variational objective using variational inference, wherein the training data includes training source sequences and, for each training source sequence, a corresponding correct target sequence, and wherein the posterior neural network is configured to, at each of a plurality of time steps while processing a training source sequence:

generate a posterior progress score for the time step conditioned on the training source sequence, a portion of the corresponding correct target sequence that should have been generated as of the time step, and progress inputs for earlier time steps during the processing of the training source sequence that specify whether outputs were emitted at the earlier time steps.

* * * * *